United States Patent [19]

Dworkin et al.

[11] 3,953,385

[45] Apr. 27, 1976

[54] NOVEL PRODUCTS AND PROCESS

[75] Inventors: Robert D. Dworkin, Old Bridge; Adam J. Ejk, Piscataway, both of N.J.

[73] Assignee: M&T Chemicals Inc., Greenwich, Conn.

[22] Filed: Dec. 5, 1974

[21] Appl. No.: 529,798

Related U.S. Application Data

[62] Division of Ser. No. 409,414, Oct. 25, 1973, abandoned.

[52] U.S. Cl. .................... 260/2.5 P; 260/45.75 H; 260/45.75 S; 260/45.75 T; 260/45.7 P; 260/23 EP; 260/23 XA
[51] Int. Cl.² ........................................ C08J 9/06
[58] Field of Search ............ 260/2.5 P, 45.75 H, 260/45.75 S, 45.75 T

[56] References Cited
UNITED STATES PATENTS

| | | | |
|---|---|---|---|
| 3,197,423 | 7/1965 | Ackerman | 260/2.5 P |
| 3,293,094 | 12/1966 | Narin et al. | 260/2.5 P |
| 3,293,108 | 12/1966 | Narin et al. | 260/2.5 P |
| 3,321,413 | 5/1967 | Riley, Jr. et al. | 260/2.5 P |
| 3,424,717 | 1/1969 | Gottlieb et al. | 260/45.75 |
| 3,503,924 | 3/1970 | Pollack | 260/45.75 |
| 3,715,333 | 2/1973 | Larkin | 260/45.75 |

*Primary Examiner*—Morton Foelak
*Attorney, Agent, or Firm*—Robert P. Auber; Kenneth G. Wheeless; Robert Spector

[57] ABSTRACT

Cellular vinyl chloride polymers are prepared in the presence of a blowing agent and a diorganotin dimercaptide such as di-n-butyltin bis(dodecyl mercaptide). These organotin compounds are unique in that they activate the blowing agent to achieve maximum gas evolution at conventional processing temperatures while imparting a superior level of heat stability to the polymer. The dimercaptide is preferably employed in combination with a specified organotin derivative of a carboxylic acid, alcohol or phenol and/or metal salts of carboxylic acids containing between 4 and 18 carbon atoms wherein the metal is selected from Group IIB of the Periodic Table.

2 Claims, No Drawings

NOVEL PRODUCTS AND PROCESS

This is a division of application Ser. No. 409,414, filed Oct. 25, 1973, now abandoned.

BACKGROUND

This invention relates to the preparation of cellular vinyl chloride polymers. This invention further relates to certain organotin compounds which not only effectively activate the blowing agents employed in preparing cellular vinyl chloride polymers but also impart superior levels of heat stability to the final product.

Cellular vinyl chloride polymers are conventionally prepared by melting a vinyl chloride resin in the presence of a blowing agent which decomposes at the processing temperature to yield a gas. The bubbles of gas evolved are entrapped within the molten resin, thereby forming a cellular structure. The foaming operation is usually performed while the resin is contained in a heated mold or in the heated barrel of an extruder, so that the resin can be simultaneously foamed and shaped into commercially useful articles, including pipe, decorative molding and structural siding. One class of blowing agents often employed in preparing cellular vinyl chloride polymers is the azodicarbonamides, exemplified by azobisformamide

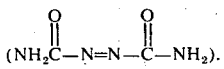

The blowing agent is preferably employed in combination with an activator for the purpose of increasing both the degree and rate of blowing agent decomposition. The resultant larger volume of gas generated is desirable, since it increases the efficiency of the blowing agent, thereby reducing the amount of blowing agent required. Temperatures employed to melt the polymer and decompose the blowing agent are between 150° and 200°C. It therefore becomes necessary to include in the formulation a stabilizer for the purpose of eliminating or at least minimizing the heat-induced discoloration of the vinyl chloride polymer which would otherwise occur at these temperatures. To increase efficiency and reduce costs it would be desirable to employ a single compound which functions effectively as both an activator for the blowing agent and a heat stabilizer.

It is well known that a variety of organotin compounds, particularly dibutyltin derivatives of mercaptocarboxylic acid esters will impart useful levels of heat stability to vinyl chloride polymers. German Pat. Nos. 2,133,372 and 2,047,969 disclose the use of organotin mercaptocarboxylic acid esters in foamed polyvinyl chloride. These compounds stabilize well but do not effectively activate blowing agents such as azobisformamide. Organotin carboxylates such as dibutyltin maleate, dibutyltin dilaurate and dibutyltin maleate-halfesters are disclosed in Japanese Pat. No. 6264/67 as being useful in flexible, i.e., plasticized, polymer foams. Although these organotin compounds activate azodicarbonamides, they are poor thermal stabilizers for the polymer. Thus, it can be seen tha organotin mercaptocarboxylic acid esters impart good thermal stability but poor blowing agent activation, while organotin carboxylates offer good activation, but poor thermal stability with a resultant lack of proper melt viscosity control.

In addition to dimethyltin-, dibutyltin- and dioctyltin-mercaptocarboxylic acid esters, other compounds that are effective heat stabilizers for vinyl chloride polymers but poor blowing agent activators are bis(dialkyltin-monomercaptocarboxylic acid ester) sulfides such as bis(dibutyltin-isooctylmercaptoacetate) sulfide, bis(-monoalkyltin-dimercaptocarboxylic acid ester) sulfides such as bis(monobutyltin-di-isooctylmercaptoacetate) sulfide, (monoalkyltin-dimercaptocarboxylic acid ester) (dialkyltin-mercaptocarboxylic acid ester) sulfides, e.g., (monobutyltin-di-isooctylmercaptoacetate) (dibutyltin-isooctylmercaptoacetate) sulfide, and monoalkyltin tris-mercaptocarboxylic acid esters, e.g., monobutyltin tris(isooctylmercaptoacetate).

Other organotin compounds have been found to be relatively ineffective with regard to both thermal stability and ability to activate blowing agents. These compounds include monoalkylthiostannoic acids and their anhydrides, e.g., butylthiostannoic anhydride, dialkyltin sulfides, e.g., dibutyltin sulfide, trialkyltin mercaptocarboxvlic acid esters, e.g., tributyltin-isooctylmercaptoacetate, and tin-tetramercaptocarboxylic acid esters, such as tin-tetra(isooctylmercaptoacetate).

Organotin carboxylates which are good blowing agent activators but poor thermal stabilizers, are monoalkyltin tris(dicarboxylic acid half-esters) such as monobutyltin tris(dodecyl maleate), dialkyltin dicarboxylic acid compounds such as dibutyltin azelate, and dialkyltin monocarboxylic acid derivatives, e.g., dibutyltin bis(tall oil fatty acid carboxylate) and dibutyltin bis(benzoate).

While it may appear obvious to attain the desired effect by combining one of the foregoing good heat stabilizers with an effective activator for the blowing agent, this approach only slightly improves the overall performance. The mixtures provide adequate thermal stabilization but only a marginal improvement in degree of blowing agent activation.

A number of non-tin-containing stabilizer-activators are currently available for use in rigid cellular polyvinyl chloride formulations. These products are almost exclusively based on compounds of barium, cadmium and lead. A major deficiency of many of these compounds is their relatively high toxicity. In addition, these metal-based compounds have been found to be less effective in static and dynamic thermal stabilization of PVC than many organotin compounds. More importantly, they cause decomposition of the azodicarbonamide blowing agent at so low a temperature that the gas is generated before it can be efficiently utilized, in other words before the polymer is in a completely molten state and therefore capable of entrapping the gas to form the desired cellular structure.

An objective of this invention is to provide foamable vinyl chloride polymer compositions that exhibit good thermal stability and blowing agent activity.

Unexpectedly it has now been found that certain organotin sulfur-containing compounds provide an optimum balance between good blowing agent activation and good thermal stability. Additionally, it has been found that these compounds can be combined with selected oxygen-containing organotin compounds or metal salts of carboxylic acids to provide the desired combination of excellent blowing agent activation and good thermal stability.

SUMMARY OF THE INVENTION

The present invention provides a combined blowing agent activator-heat stabilizer for preparing cellular vinyl chloride polymers, wherein the activator-stabilizer is a diorganotin compound exhibiting the general formula $R_2^1Sn(SR^2)_2$ wherein $R^1$ represents an alkyl radical containing between 1 and 18 carbons, inclusive, or a cycloalkyl, aryl, alkaryl or aralkyl radical, each of which contain between 6 and 18 carbon atoms, inclusive; $R^2$ represents an alkyl radical containing between 4 and 18 carbon atoms, inclusive, or an aryl, alkaryl or aralkyl radical, each of which contain between 6 and 18 carbon atoms, inclusive. These compounds are optionally used in combination with between 1 and 95%, based on the weight of said diorganotin compound, of a) an organotin compound exhibiting the general formula $R_a^3SnX_{4-a}$ wherein $R^3$ is selected from the same group as $R^1$, X represents a radical selected from the group consisting of

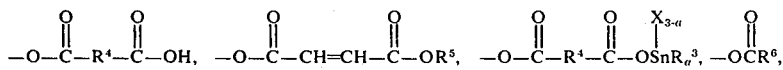 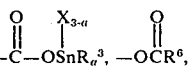 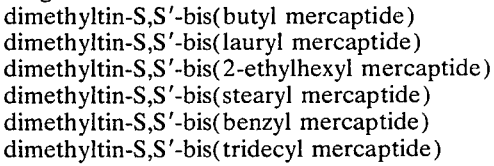

$R^7$ and $R^8$ wherein $R^4$ represents an alkylene, arylene or aralkylene radical containing between 1 and 12 carbon atoms, inclusive, $R^5$ and $R^6$ are selected from the same group as $R^1$, $R^7$ represents the residue resulting from removal of the hydrogen atom from a hydroxyl group of a phenol or an alcohol, said alcohol containing between 2 and 18 carbon atoms and 1 to 4 hydroxyl radicals, $R^8$ represents a radical of the formula

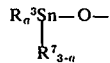

and a represents the integer 1 or 2, and/or (b) a metal salt of a carboxylic acid containing between 4 and 18 carbon atoms wherein the metal is selected from Group IIB of the Periodic Table.

The diorganotin dimercaptide or the combination of said dimercaptide with the compound $R_a^3SnX_{4-a}$ and metal carboxylate is employed at a total concentration of 0.1 to 10 parts per 100 parts of resin.

DETAILED DESCRIPTION OF THE INVENTION

The unique combination of blowing agent activation and heat stabilization of cellular vinyl chloride polymers is achieved using diorganotin dimercaptides of the general formula $R_2^1Sn(SR^2)_2$ wherein $R^1$ represents an alkyl radical containing between 1 and 18 carbon atoms, inclusive, or a cycloalkyl, aryl, alkaryl or aralkyl radical, each of which contain between 6 and 18 carbon atoms, inclusive and $R^2$ represents an alkyl radical containing between 4 and 18 carbon atoms or a cycloalkyl, aryl, alkaryl or aralkyl radical, each of which contain between 6 and 18 carbon atoms, inclusive. Alkyl radicals which can be represented by $R^1$ include methyl, ethyl, n-propyl, iso-propyl, n-butyl, sec-butyl, t-butyl, n-hexyl, n-octyl, iso-octyl and 2-ethylhexyl in addition to the isomeric decyl, dodecyl, heptadecyl and octadecyl radicals. When $R^2$ represents an alkyl radical it can be selected from the same group as $R^1$ with the proviso that it contain at least 4 carbon atoms.

When $R^1$ and/or $R^2$ represent cycloalkyl radicals, these include cyclopentyl, cyclohexyl, cycloheptyl and cyclooctyl, each of which may contain one or more alkyl radicals as substituents, for example 2-methyl cyclohexyl.

Aryl radicals which can be represented by $R^1$ and/or $R^2$ include phenyl, naphthyl, biphenyl and anthracenyl.

When $R^1$, $R^2$ or both represent alkaryl radicals they can be tolyl, o—, p— or m-xylyl, or ethyl phenyl, among others. Suitable aralkyl radicals include benzyl, β-phenylethyl and γ-phenylpropyl, among others.

Preferred diorganotin mercaptides include the following:

dimethyltin-S,S'-bis(butyl mercaptide)
dimethyltin-S,S'-bis(lauryl mercaptide)
dimethyltin-S,S'-bis(2-ethylhexyl mercaptide)
dimethyltin-S,S'-bis(stearyl mercaptide)
dimethyltin-S,S'-bis(benzyl mercaptide)
dimethyltin-S,S'-bis(tridecyl mercaptide)

in addition to the corresponding dipropyltin, dibutyltin, dicyclohexyltin, di-n-octyltin, distearyltin and diphenyltin derivatives of these mercaptans.

The efficacy of the diorganotin dimercaptides both as activators for the blowing agent and as heat stabilizers is substantially increased when the dimercaptide is used in combination with a mono- or diorganotin derivative of a carboxylic acid, alcohol or phenol. These derivatives exhibit the general formula $R_a^3SnX_{4-a}$ wherein $R^3$, X and a are as previously defined. The carboxylic acids can be either aliphatic or aromatic and contain between 1 and 18 carbon atoms. Aliphatic acids may be saturated or may exhibit one or more double bonds between adjacent carbon atoms such as are present in maleic and oleic acids and the fatty acids derived from tall oil. The acids can be polyfunctional, such as maleic acid and phthalic acid.

Suitable carboxylic acids contain between 2 and 18 carbon atoms and include acetic, propionic, maleic, butyric, hexoic, butanedioic, lauric, stearic, octadecanoic, oleic, benzoic and the isomeric phthalic acids. The alcohols which can be employed to prepare the organotin compound include monofunctional alcohols such as methanol, ethanol, isomeric butanols, hexanols, dodecanols, octadecanols and cyclohexanol. Polyfunctional alcohols such as the alkylene glycols, glycerine and pentaerythritol are also suitable. Organotin derivatives of phenols and alkylated phenols can also be employed in combination with the present diorganotin dimercaptides.

Blowing agent activation and heat stability are further enhanced if the aforementioned organotin compounds are employed in combination with 1–10%, based on the weight of the stabilizer-activator composition, of soaps of Group IIB metals, wherein the carboxylic acid residues each contain between 4 and 18 carbon atoms.

When in accordance with a preferred embodiment of this invention, the diorganotin mercaptides are employed in combination with a mono- or diorganotin compound containing at least one tin-oxygen bond, the combination may be present as a physical mixture or at least partly in the form of one or more reaction products. The chemical and patent literature contains numerous examples demonstrating that members of two or more different classes of organotin compounds may react with one another under certain conditions to yield products containing one or more tin atoms wherein at least a portion of the tin atoms are bonded to different combinations of radicals than were present in the starting materials. While the mechanism for the reactions involved may not be completely understood, the end result is that the hydrocarbon, mercaptide, carboxy

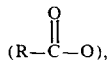

alkoxy and/or araloxy radicals present in the organotin compounds of this invention may be transferred from one tin atom to another. For example, a mixture of dibutyltin dilauryl mercaptide and monooctyltin trilaurate could conceivably react to yield a compound wherein the tin atom is bonded to one butyl, one octyl, one laurylmercaptide ($C_{12}H_{25}S-$) and one laurate radical.

Vinyl chloride polymer compositions which yield cellular materials when heated are conveniently prepared by blending the polymer together with the blowing agent, organotin compound(s) and other ingredients to obtain a homogeneous mixture. The organotin compounds present, which consist of the aforementioned diorganotin dimercaptides either alone or preferably in combination with a mono- or diorganotin derivative of a carboxylic acid, alcohol or phenol as described hereinbefore, constitute between 0.1 and 10%, based on the weight of the polymer composition. If organotin compounds other than the aforementioned dimercaptides are present, these compounds constitute between 5 and 95%, based on the total weight of the organotin compounds, preferably between 5 to 50%.

It has been disclosed hereinbefore that the performance exhibited by the organotin compounds of this invention can be further enhanced by the presence of between 1 and 10%, based on the weight of the stabilizer-activator composition, of salts derived from carboxylic acids and elements from Group IIB of the periodic table. These elements include zinc, cadmium and mercury, with salts of zinc being preferred, such as zinc stearate.

The present compositions can utilize any of the known blowing agents that are conventionally employed for preparing cellular vinyl chloride polymers. The concentration of blowing agent is usually between 0.2 and 5.0%, based on the weight of the polymer composition prior to foam formation.

In addition to the blowing agent activator-heat stabilizer compositions described in the foregoing specification and appended claims, the vinyl chloride polymer compositions of this invention may contain additives for the purpose of increasing the heat stability, resistance to oxidation, flame retardancy and impact resistance of the polymer. Conventional processing acids such as lubricants and plasticizers can also be present.

Useful heat stabilizers include diorganotin derivatives of mercaptoacid esters, particularly those wherein the hydrocarbon radicals bonded to the tin atom contain between 1 and 8 carbon atoms; trialkyl or triaryl esters of phosphorus acid, including symmetrically and unsymmetrically substituted triorgano phosphite such as tris(nonyl phenyl phosphite); esters of thiodipropionic acid; compounds containing one or more epoxide groups

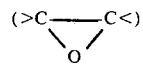

such as are disclosed in U.S. Pat. No. 2,997,454 and α— or β— mercapto acids such as thiolactic acid and β-mercaptopropionic acid.

Among the antioxidants suitable for use in the present polymer compositions are phenols, particularly those wherein the positions adjacent to the carbon atom bearing the hydroxyl radical contain alkyl radicals as substituents. Phenols wherein this alkyl radical is sterically bulky, e.g. a tertiary butyl radical, are preferred.

When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

As used in this specification, the term "vinyl chloride polymers" refers both to vinyl chloride homopolymers and to copolymers wherein at least 50% of the repeating units are derived from vinyl chloride, the remainder being derived from one or more ethylenically unsaturated compounds that will copolymerize with vinyl chloride. Suitable comonomers include but are not limited to vinyl acetate, vinylidene chloride, ethylene and other olefinic hydrocarbons, acrylonitrile, and esters of acrylic or methacrylic acids.

The following examples demonstrate preferred embodiments of this invention and should not be interpreted as limiting the scope thereof. All parts by weight unless otherwise specified.

EXAMPLE 1

This example demonstrates the extent to which azobisformamide

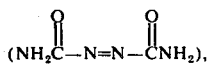

(NH$_2$C—N=N—CNH$_2$), a conventional blowing agent for preparing cellular vinyl chloride polymers, is activated using various compounds. The degree of activation was determined by measuring the volume of gas evolved while a mixture containing 100.0 g of dioctyl phthalate, 1.0 g. of azobisformamide and 2.0 g. of the indicated activator was being heated from ambient temperature to 220°C. at a rate of 5°C. per minute. The purpose of the dioctyl phthalate was to provide the suspending medium for a homogeneous system.

The mixture was placed in a 250 c.c.-capacity 1-neck-round bottomed flask equipped with a thermometer and an outlet tube. The gas evolved which consisted of nitrogen and oxides of carbon was collected by displacement of water from a graduated cylinder. The volume of gas which had been collected when the temperature of the mixture reached a specified level was recorded. These data appear in Table I. The theoretical yield of gaseous products from one gram of azobisformamide is about 230 c.c., measured at standard temperature (25°C.) and pressure (760 m.m. Hg).

TABLE I

| ACTIVATOR | TOTAL VOLUME OF GAS COLLECTED(IN c.c.) WHEN THE TEMPERATURE REACHED | | | | | |
|---|---|---|---|---|---|---|
| | 130°C. | 150°C. | 170°C. | 190°C. | 210°C. | 220°C. |
| None | 3 | 10 | 10 | 15 | 80 | 205 |
| Di-n-butyltin-S,S'-bis(IOMA)[1] (A) | 0 | 5 | 15 | 75 | 165 | 185 |
| Barium-Cadmium Mixture[2] (B) | 20 | 110 | 195 | 235 | —[3] | —[3] |
| Di-n-butyltin-S,S'-bis(dodecyl mercaptide) (C) | 0 | 10 | 40 | 220 | —[3] | —[3] |

[1]IOMA = isooctyl mercaptoacetate.
[2]A mixture of barium and cadmium carboxylates containing 7% by weight of barium and 14% cadmium.
[3]Gas evolution was substantially complete.

Of the three formulations tested, only the one containing di-n-butyltin-S,S'-bis(dodecyl mercaptide) provided the major portion of gas evolution between temperatures of 170° and 190°C. Since polyvinyl chloride is conventionally processed at temperatures between 170° and 200°C., only gas evolved at these temperatures would be effectively utilized in foam formation.

The formulations which contained either no activator or the isooctyl mercaptoacetate derivative did not exhibit significant gas evolution until the temperature exceeded 200°C. These higher temperatures could accelerate degradation of the vinyl chloride polymer resulting in a darkening and embrittlement to the extent that the polymer is no longer considered a commercially useful product.

The formulation containing the mixture of barium and cadmium carboxylates is considered inefficient for the preparation of cellular vinyl chloride polymers because most of the gas had been evolved when the temperature reached 170°C., and therefore could not be completely utilized in foam formation since the polymer would be a solid or a viscous semi-solid below this temperature.

EXAMPLE 2

This example demonstrates that a number of organotin derivatives of isooctyl mercaptoacetate are not suitable as blowing agent activators for preparing cellular vinyl chloride polymers.

The test formulation was identical to that described in Example 1 and contained the organotin compounds listed in the following table as prospective activators for the azobisformamide.

TABLE II

| ACTIVATOR | TOTAL VOLUME OF GAS (c.c.) COLLECTED WHEN THE TEMPERATURE REACHED | | | | | |
|---|---|---|---|---|---|---|
| | 170°C. | 180°C. | 190°C. | 200°C. | 210°C. | 220°C. |
| Dimethyltin S,S'-bis-IOMA[1] | 10 | 18 | 80 | 160 | 180 | 190 |
| Dioctyltin S,S'-bis-IOMA[1] | 18 | 30 | 100 | 165 | 185 | 195 |
| Tin Tetra IOMA | 3 | 10 | 33 | 65 | 79 | 92 |
| Monobutyltin-S,S'-S''-tris-IOMA | 10 | 50 | 95 | 118 | 135 | 150 |
| Tributyltin-S-IOMA | 10 | 19 | 38 | 72 | 135 | 165 |
| None | 10 | 10 | 15 | 23 | 75 | 195 |

[1]isooctyl mercaptoacetate.

None of the formulations set forth in Table II generated substantial amounts of gas at temperatures below 190°C. The class of organotin mercapto acetic acid esters appears to be relatively ineffective as an activator for the blowing agent at temperatures conventionally employed to process cellular vinyl chloride polymers.

Since diorganotin derivatives of mercaptoacetic acid esters are among the best single component stabilizers for vinyl chloride polymers, it would therefore appear reasonable to employ these compounds in combination with other organotin compounds which would be expected to function as activators for the blowing agent. To test the validity of this assumption, formulations containing 100 g. of dioctyl phthalate, 1 g. of azobisformamide, 1.8 g. di-n-butyltin-S,S'-bis(isooctyl mercaptoacetate) and 0.2 g. of various organotin compounds were prepared and tested as described in Example 1.

The organotin compounds evaluated in combination with di-n-butyltin-S,S'-bis(isooctyl mercaptoacetate) were dibutyltin sulfide, monobutyltin trichloride, dibutyltin oxide and dibutyltin maleate. The latter compound enhances the performance of di-n-butyltin-S,S'-bis(dodecyl mercaptide). None of these formulations had yielded more than 50 c.c. of gas when the temperature of the mixture reached 180°C. By contrast, the formulation containing 2 g. of di-n-butyltin-S,S'-bis(isooctyl mercaptoacetate) and no other organotin compound produced 105 c.c. of gas under the same conditions.

EXAMPLE 3

This example demonstrates the further improvement in blowing agent activation obtained when a diorganotin dimercaptide of this invention, dibutyltin-S,S'-bis(tridecyl mercaptide), is employed in combination with a) a mono- or diorganotin derivative of a carboxylic acid and/or b) a zinc salt of a carboxylic acid. The formulations were prepared and tested as described in Example 1. Unless otherwise indicated, the weight ratio of the organotin mercaptide to the other organotin compound was 9:1, respectively, the total amounting to 2 grams per 100 grams of dioctyl phthalate.

Dibutyltin dilaurate at a concentration of 2 parts per 100 parts of plasticizer and in the absence of an organotin mercaptide was evaluated as a control. The formulation had produced only 54 c.c. of gas when the temperature reached 180°C. The yield of gas was 117 c.c. at a temperature of 190°C.

TABLE III

| ACTIVATOR= 1.8 g. of dibutyltin bis(tri-dodecyl mercaptide) + 0.2 g. of co-activator | Total Volume of Gas (in c.c.) Evolved When Temperature of Mixture Reached | | | |
|---|---|---|---|---|
| | 160°C. | 170°C. | 180°C. | 190°C. |
| Zinc Octanoate | 18 | 75 | 205 | 245 |
| Dibutyltin dilaurate | 15 | 50 | 130 | >240 |
| Dibutyltin bis(isooctyl maleate | 18 | 54 | 134 | >240 |
| Monobutyltin tris (dodecyl maleate) | 12 | 28 | 94 | 225 |
| Monobutyltin tris (dodecyl maleate) + zinc octanoate[1] | 15 | 65 | 175 | 245 |
| Dibutyltin dilaurate + zinc octanoate[1] | 25 | 80 | 190 | >240 |
| Dibutyltin dibutoxide[2] | 18 | 75 | 200 | >240 |

[1]1:1 weight ratio mixture
[2]Dibutyltin bis(dodecyl mercaptide) used in place of dibutyltin bis(tridecyl mercaptide)

EXAMPLE 4

This example demonstrates other representative organotin mercaptides which are suitable for use as activator-stabilizers in the preparation of cellular vinyl chloride polymers. Formulations containing dioctyl phthalate, azobisformamide and the organotin compound were prepared and tested as described in Example 1. The results of the evaluations are summarized in the following table.

TABLE IV

| Activator | Total Volume of Gas (c.c.) Collected When the Temperature Reached | | | |
|---|---|---|---|---|
| | 160°C. | 170°C. | 180°C. | 190°C. |
| dibutyltin-S,S'-bis (benzyl mercaptide) | 5 | 50 | 135 | 222 |
| dimethyltin-S,S'-bis (dodecyl mercaptide) | 10 | 32 | 195 | >240 |

EXAMPLE 5

This example demonstrates the efficacy of the present activator-stabilizers in promoting decomposition of another commercial blowing agent, p-toluene sulfonyl semicarbazide. The formulation employed for the evaluation contained 100 parts of dioctyl phthalate, 1.0 part of the blowing agent and 2.0 part of the organotin compound. The formulation was heated from ambient to about 250°C. at a rate of 5°C. per minute, and the amount of gas evolved was measured as described in Example 1, and is recorded in the following table. The results obtained using dibutyltin-S,S'-bis(isooctyl mercaptoacetate) are included for purposes of comparison.

TABLE V

| Activator | Total Volume of Gas (c.c.) Collected When the Temperature Reached | | | | | | |
|---|---|---|---|---|---|---|---|
| | 160°C. | 180°C. | 190°C. | 200°C. | 210°C. | 220°C. | 240° |
| None | 1 | 2 | 4 | 10 | 22 | 44 | 120 |
| dibutyltin-S,S'-bis IOMA[1] (control) | 10 | 13 | 15 | 25 | 75 | 127 | 175 |
| dibutyltin-S,S'-bis(dodecyl mercaptide) | 10 | 13 | 20 | 45 | 105 | 140 | 165 |
| dibutyltin-S,S'-bis(dodecyl | | | | | | | |

TABLE V-continued

| Activator | Total Volume of Gas (c.c.) Collected When the Temperature Reached | | | | | | |
|---|---|---|---|---|---|---|---|
| | 160°C. | 180°C. | 190°C. | 200°C. | 210°C. | 220°C. | 240° |
| mercaptide) (90%) + dibutyltin dilaurate (10%)[2] | 10 | 13 | 20 | 60 | 125 | 153 | 175 |

[1]IOMA = isooctyl mercaptoacetate
[2]total activator content = 2 parts

EXAMPLE 6

This example demonstrates the improvement in both static and dynamic stability of vinyl chloride polymers containing the activator-stabilizers of this invention.

The stability of a conventional formulation employed to prepare cellular polymer was evaluated by blending the formulation on a 2-roll differential speed mill heated to a temperature of 165°C. until a homogeneous sheet was obtained. The sheet was then removed from the mill. Test specimens in the form of squares measuring 1 inch (2.5 cm.) along each side were cut from the sheet and placed in a circulating air oven that was maintained at a temperature of 190°C.

Samples were withdrawn at 5 or 10 minute intervals for a color evaluation. The results of the evaluation are recorded in the following Table VI. The formulation employed to prepare the test specimens contained:

| | Parts by Weight |
|---|---|
| Vinyl Chloride Homopolymer ($\eta$inherent=0.8 | 100.0 |
| Calcium carbonate (Omyalite 90 T) | 6.0 |
| Processing acid(acrylic polymer, K-120 N) | 3.0 |
| Acrylonitrile-butadiene-styrene terpolymer (Blendex 401) | 3.0 |
| Titanium dioxide | 2.0 |
| Azobisformamide blowing agent | 1.0 |
| Paraffin Wax (m.p.= 93°C.) | 0.8 |
| Calcium Stearate | 0.5 |
| Stabilizer (as shown in Table VI) | 2.0 |

The stabilizers in Table VI are designated by letters as follows:

D — dibutyltin-S,S'-bis(isooctyl mercaptoacetate) (control)

E — A mixture of barium and cadmium carboxylates containing 7% Ba and 14% Cd (available as Nuostabe V-133 from Tenneco Chemicals, Inc.).

F — A 90:10 weight ratio mixture of dibutyltin-S,S'-bis(tridecyl mercaptide) and dibutyltin dilaurate, respectively.

TABLE VI

| Time (Min.) | Stabilizer | | |
|---|---|---|---|
| | D (control) | E (control) | F |
| 0 | White-yellow | Pink | White |
| 5 | Yellow-white | Pink | White |
| 10 | Light-yellow | Pink(yellow tinge) | White |
| 15 | Yellow | Yellow(pink tinge) | White-yellow |
| 20 | Dark Yellow | Dark Yellow | Light-yellow-brown |
| 30 | Yellow-brown | Dark brown | Yellow-brown |
| 40 | Light brown | Very dark brown | Brown |

The foregoing data clearly indicate the improved effectiveness of the present activator-stabilizers over prior art materials.

The dynamic stability imparted by one of the present activator-stabilizers, a 90:10 weight ratio mixture of dibutyltin-S,S'-bis(tridecyl mercaptide) and dibutyltin dilaurate, respectively, was compared with that of formulations containing stabilizers D and E of Table VI. The formulation employed was identical to that disclosed in the first part of this example, with the exception that the vinyl chloride homopolymer exhibited an intrinsic viscosity of 0.78 and was identified as Geon 110 × 223 (available from B. F. Goodrich Chemical Corporation).

The formulations were evaluated by placing each one individually into the chamber of a mixing bowl attached to a Plasticorder torque rheometer manufactured by C. W. Brabender Instruments, Inc. The temperature within the mixing bowl chamber was 200°C. and the two rotors turned in opposite directions at speeds of 60 and 40 revolutions per minute. The torque required to maintain the rotors at a constant speed was recorded on a graph as a function of time. The torque increased abruptly when the formulation was placed in the mixing bowl chamber and reached a maximum value within about one or two minutes. This maximum value gradually decreased as the formulation fused and the viscosity of the resultant melt decreased. There was a noticeable increase in the torque as the polymer began to decompose and cross-link. The period of time between fusion, i.e. liquefaction of the formulation, and the point at which the torque first exhibited an increase due to decomposition of the polymer was measured and is recorded below. The stabilizers are designated A, B and C as defined in Example 1 of this specification.

TABLE VII

| Activator-stabilizer | Stabilization Period(minutes) |
|---|---|
| A | 19.9 |
| B | 15.1 |
| C | 19.6 |

What is claimed is:

1. A composition for preparing rigid cellular vinyl chloride polymers, said composition comprising
   a. 100 parts by weight of a vinyl chloride homopolymer or a copolymer of vinyl chloride with a copolymerizible ethylenically unsaturated monomer,
   b. between 0.1 and 10 parts of a blowing agent, and
   c. between 0.1 and 10 parts of a combined blowing agent activator and heat stabilizer which in turn comprises a diorganotin mercaptide compound of the formula $R_2{}^1Sn(SR^2)_2$ wherein $R^1$ and $R^2$ are hydrocarbyl groups.

2. A composition as set forth in claim 1 wherein the diorganotin compound is selected from the group consisting of dibutyltin-S,S'-bis(dodecyl mercaptide), dibutyltin-S,S'-bis(tridecyl mercaptide), dibutyltin-S,S'-bis(benzyl mercaptide) and dimethyltin-S,S'-bis(dodecyl mercaptide).

* * * * *